United States Patent [19]

Vindez

[11] Patent Number: 4,612,998
[45] Date of Patent: Sep. 23, 1986

[54] RETRACTING POSITIVE FEED DRILL WITH IDLE MODE

[75] Inventor: Pierre G. Vindez, Redondo Beach, Calif.

[73] Assignee: P. V. Tool, Inc., Gardena, Calif.

[21] Appl. No.: 630,325

[22] Filed: Jul. 12, 1984

[51] Int. Cl.⁴ .......................................... B23B 47/22
[52] U.S. Cl. ..................................... 173/19; 175/145; 408/137
[58] Field of Search ...................... 173/19, 29, 47, 145; 408/14, 132, 137

[56] References Cited

U.S. PATENT DOCUMENTS

| | | | |
|---|---|---|---|
| 2,722,855 | 11/1955 | Van Scoy | 408/137 X |
| 3,512,434 | 5/1970 | Juhasz et al. | 408/137 X |
| 3,583,822 | 6/1971 | Alexander et al. | 408/137 X |
| 3,897,166 | 7/1975 | Adams | 408/14 |
| 4,418,767 | 12/1983 | Virder | 173/19 |

Primary Examiner—E. R. Kazenske
Assistant Examiner—William Fridie, Jr.
Attorney, Agent, or Firm—Freilich, Hornbaker, Rosen & Fernandez

[57] ABSTRACT

A positive feed drill having a spindle drive gear train and a spindle feed gear train coupled to the drive gear train by side teeth on coupling gears mounted on the same shaft is provided with actuatable means for uncoupling the feed coupling gear from the drive coupling gear, and locking it when the spindle has been fed a predetermined extent, thereby retracting the spindle, and for unlocking the feed gear train, once the spindle is retracted, without recoupling it to the drive gear train, thereby holding the feed gear train in an idle mode until the automatic means is manually reset. The automatic means is comprised of a piston which raises the shaft of the feed coupling gear out of engagement with the drive coupling gear and into engagement of fixed teeth on the inside of the gear housing, and spring biased means including a slot for holding the shaft and feed coupling gear away from the drive coupling gear to an extent determined by a dimension of the slot so as not to permit re-engagement of the drive coupling gear after disengagement with the fixed teeth, thereby holding the feed gear in an idle mode until the spring biased means is manually reset against the force of the spring.

5 Claims, 12 Drawing Figures

U.S. Patent   Sep. 23, 1986   Sheet 1 of 3   4,612,998

RETRACTING POSITIVE FEED DRILL WITH IDLE MODE

BACKGROUND OF THE INVENTION

This invention relates to positive feed power drills having a spindle drive gear train and a spindle feed gear train arranged to be driven by the same motor, and having means for disengaging and locking the spindle feed gear train for reversal of the positive feed drive, and more particularly to a system for holding the feed gear train disengaged from the drive gear train, but unlocked, after the spindle has been retracted and the retracting hydraulic pressure has been removed from the piston.

Positive feed power drills normally have a single motor for turning a spindle through a drive gear train. The spindle is threaded into a feed gear that turns for advancing the spindle as the drill progresses through a work piece. The feed gear is driven by a gear train from the same motor as the drive gear train, but the gear ratio of the drive gear train is selected to be slightly less than the gear ratio of the feed gear train so the feed gear will turn slightly faster than the drive gear. In that way, the spindle is advanced a predetermined amount for each turn through the work piece.

Once the spindle has been advanced sufficiently, a hydraulic piston is actuated to disengage the spindle feed gear train from the drive gear train and lock it in place. As the motor continues to drive the spindle in the same direction, the spindle threads turn inside the locked feed gear to rapidly retract the spindle. Once the spindle has been fully retracted, the hydraulic pressure on the piston is still on, so the feed gear train now rotates at the same rate as the drive gear train, causing the engaging side teeth of the feed coupling gear to ratchet over the fixed teeth until pressure in the piston cylinder has been manually relieved. It would be desirable to provide means for eliminating the ratcheting by automatically removing the hydraulic pressure and holding the feed gear train out of engagement with the drive gear train after the hydraulic pressure is automatically removed from the piston, until such time as the holding means is manually reset to recycle the positive feed drill for another drilling or countersinking cycle.

SUMMARY OF THE INVENTION

The idling system of the present invention is practiced in a positive drive power drill having a threaded spindle passing through an internally threaded feed gear, a drive gear slidably locked onto the spindle, a drive gear train extending from a drive motor through a coupling gear to the spindle drive gear to turn the spindle at a rate set by the motor through this gear train, and a spindle feed gear train extending from a coupling gear to the spindle feed gear. The spindle feed coupling gear is releasably locked to the spindle drive coupling gear by side teeth for turning the spindle feed gear train as the spindle drive gear is turned by the motor. The gear ratios for the two trains are selected to drive the spindle feed gear at a faster rate than the spindle drive gear.

The feed coupling gear is mounted with a bearing on the same shaft that the drive coupling gear is mounted, but the latter is mounted with a bearing on a sleeve surrounding the shaft so that the shaft may be moved axially without moving the drive coupling gear from its plane of rotation. The bearing for the spindle feed gear rests on a flange formed as a unitary part of the shaft so that it moves axially with the shaft. A hydraulic piston is arranged at one end of the shaft for so moving the shaft along its axis against the force of a spring as to raise lower side teeth of the feed coupling gear out of engagement with upper side teeth of the drive coupling gear, and raise upper side teeth of the spindle feed coupling gear into locking engagement with fixed teeth on the gear train housing while the spindle drive gear train continues to rotate. That reverses the relative rotation of the spindle in the feed gear so that the spindle is rapidly retracted. Hydraulic pressure is provided to the piston through a passage in the gear housing when a valve stem is moved to a second position by means associated with the spindle after having been advanced to a predetermined extent.

As the spindle is retracting, the valve stem is returned to its first position by suitable means, such as a nut on the spindle located at the lower end of the housing that pushes up on the end of the valve stem protruding from the lower side of the housing. This removes the hydraulic pressure which actuates the piston, allowing the spring to force the feed coupling gear away from the fixed teeth on the gear train housing and toward the drive coupling gear sufficiently to eliminate ratcheting. To prevent re-engagement of lower side teeth of the feed coupling gear with upper side teeth of the drive coupling gear, a latching means engages the shaft to prevent it from fully returning. The teeth on the lower side of the feed coupling gear are thus prevented from engaging the teeth on the upper side of the drive coupling gear, while teeth on the upper side of the feed coupling gear are disengaged from fixed teeth on the housing. To recycle the tool, i.e., to perform another drilling or countersinking operation, the latching means is manually reset.

In one embodiment, the piston is affixed on top of the shaft, and the latching means on the bottom of the shaft takes the form of a rod in a sleeve with its axis perpendicularly intersecting the axis of the shaft. The rod has a notch of a depth sufficient for the shaft to drop under the force of a spring between the piston housing and the feed coupling gear sufficiently for the feed coupling gear to engage the drive coupling gear. The shaft in the notch holds the rod in its sleeve against the force of a compressed spring. When the shaft is lifted by the piston, the spring moves the rod so that its slot is no longer under the shaft. Then when hydraulic pressure on the piston is released and the spring between the feed coupling gear and the piston housing urges the shaft downwardly, the shaft will move only until it rests on the rod on one side of the notch. This movement is not sufficient to engage the side teeth of the feed coupling gear with the side teeth of the drive coupling gear, but is enough to disengage upper side teeth of the feed coupling gear from the fixed teeth on the housing. Thereafter, when the rod is manually pushed in against the spring, the notch of the rod will be moved to a position under the shaft. The spring between the feed coupling gear and the housing will thus force the feed coupling gear into coupling with the drive coupling gear for another drilling or countersinking cycle.

In another embodiment, the notch is formed in the shaft itself, and a disk cut out to fit around one side of the shaft is pivotally mounted with a coiled spring attached to it. When the shaft is moved upwardly by the piston until the notch is in alignment with the disk, the coiled spring will cause the disk to pivot about 40° to move the cut-out part of the disk past the notch and move the uncut part of the disk into the notch. The dimension of the notch is sufficient for the shaft to be moved back once hydraulic pressure is released from the piston cylinder, but only to an extent sufficient to disengage the feed coupling gear from the fixed teeth in the housing, and not enough to engage the drive coupling gear. Thereafter, when the disk is turned back manually to align its cut-out portion with the shaft, the spring will then force the shaft the remaining distance necessary to engage the feed coupling gear with the drive coupling gear.

In both embodiments, the piston is preferably at the end of the shaft opposite the latching means, but that is not a requirement of the invention. All that is required is that the shaft be moved by the piston to transfer the feed coupling gear from a first position in engagement with the drive coupling gear to a second position in engagement with the fixed teeth on the housing, and that the notch on the rod or shaft be of such a dimension as to allow the shaft to return only part of the way to disengage the coupling feed gear from fixed teeth in the gear housing without actually engaging the drive coupling gear once pressure is released in the piston cylinder.

The novel features of the invention are set forth with particularity in the appended claims. The invention will best be understood from the following description when read in connection with the accompanying drawings.

DESCRIPTION OF PREFERRED EMBODIMENTS

Figure 1:
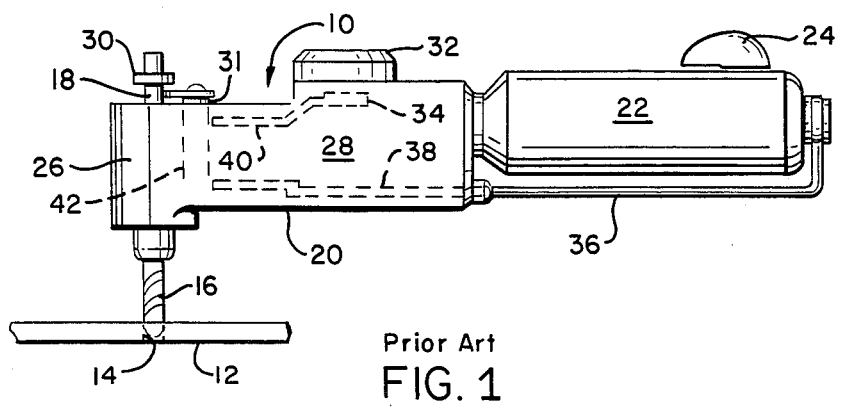
FIG. 1 is a side view in elevation of a prior art positive feed drill for drilling holes through a work piece, as disclosed in U.S. patent application Ser. No. 240,785.

Referring to FIG. 1, a positive feed drill 10 is shown on a work piece 12 through which a hole 14 is to be made by a drill bit 16 on the end of a spindle 18. In practice, a spacer is attached to a main housing 20 of the drill, and the entire assembly is either clamped or hand held to the work piece. An air driven motor 22, with a hand operated lever switch 24, drives the spindle through a gear train in the main housing 20. This priorart drill is disclosed in greater detail in U.S. Pat. No. 4,418,767.

The main housing 20 encloses a spindle actuator section 26 and a gear train section 28. These two sections include a spindle drive gear train for turning the spindle and a spindle feed gear train for advancing the spindle as it turns. An adjustable nut 30 on the spindle 18 (fixed in a selected position by a set screw) actuates a valve stem 31 to cause the spindle to be retracted, as will be described more fully hereinafter. A cap 32 provides access to a piston 34 in the gear train section which disengages the spindle feed gear train and locks it so that continued turning of the spindle drive gear train retracts the spindle when the piston is caused to move up in a cylinder under hydraulic pressure introduced through a tube 36 that couples air under pressure to the main housing.

Passages 38 and 40 convey air from the tube 36 to the piston via a valve 42. The valve system 31 is caused to move downwardly when the nut 30 on the spindle has reached the top of the valve stem after drilling. Moving the valve stem down causes the air passage 38 to be connected to the air passage 40 by the valve 42. This introduces air under pressure into the piston cylinder to raise the piston and disengage the spindle feed train thereby causing the spindle to be retracted. Once the valve stem is moved down, it will protrude from the bottom of the drill housing. A button on the end of the protruding valve stem is used to manually return the valve stem after the spindle is retracted. That automatically initiates another drilling cycle, unless the motor 22 has been turned off by lever switch 24.

Figure 2:
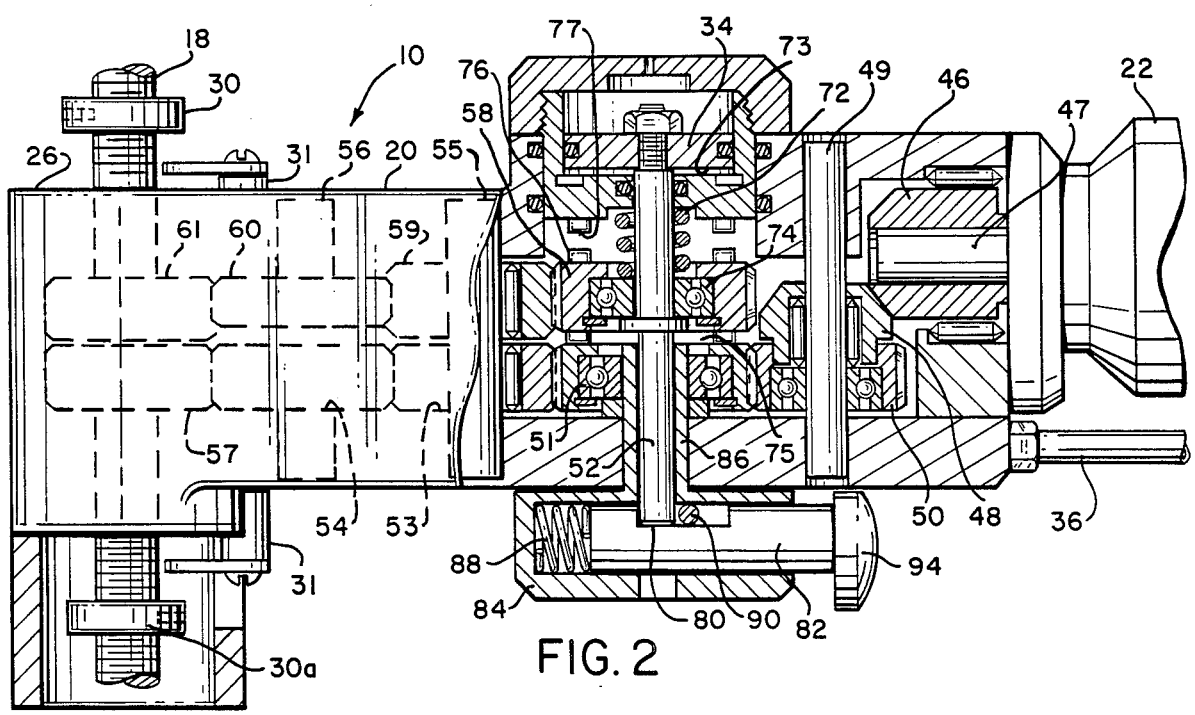
FIG. 2 shows a vertical cross section of part of the drill shown in FIG. 1 with a modification embodying the invention shown in the feed mode.

Referring now to FIG. 2, which shows a vertical cross section of part of the main housing 20 attached to the motor 22, the general arrangement for driving and feeding the spindle 16 will first be described. The modification which constitutes the present invention will then be described in two embodiments.

A beveled gear 46 keyed on the motor shaft 47 meshes with a beveled gear 48 on a vertical shaft 49. Integral with the beveled gear 48 is a gear 50 which meshes with a drive coupling gear 51 on a vertical shaft 52 for the spindle drive train comprised of idlers 53 and 54 on respective vertical shafts 55 and 56, and a gear 57 slidably keyed to the spindle 18. Mounted on the shaft 52 is a second coupling gear 58 for the spindle feed gear train comprised of idlers 59 and 60 on shafts 55 and 56, and a spindle feed gear 61 threaded on the spindle 18. As the motor turns, the gear 57 turns, thus turning the spindle. The key, or keys, which cause the spindle to rotate with the gear 57 slide in longitudinal slots or keyways (not shown) in the spindle so the spindle may advance.

The feed coupling gear 58 is normally locked onto the drive coupling gear 51 by side teeth so that it too is driven by the motor through the beveled gears 46 and 48, and the gear 50 locked with the beveled gear 48. Thus, the drive coupling gear 51 turns the feed coupling gear 58 through interlocking side teeth. The spindle feed gear 61 is thus turned through the idlers 59 and 60 while the drive coupling gear 51 turns the spindle drive gear 57 through the idlers 53 and 54. If the gear ratios of both trains were the same, the spindle feed gear 61 would turn with the spindle drive gear 57, and the spindle 16 would not be advanced toward the work piece. Consequently, the gear ratio is made slightly higher for the feed gear 61 so that, as it turns faster than the spindle drive gear 57, its threads engaging the threaded spindle will feed the spindle toward the work piece at a rate proportional to the difference in speed of rotation of the gears 57 and 61. This basic principle of positive feed drilling was first disclosed in 1890 in U.S. Pat. No. 434,576.

When the spindle has been advanced sufficiently for the nut 30 to actuate the valve stem 31, air under pressure is connected from the passage 38 to the passage 40 shown in FIG. 1. This air under pressure forces the piston 34 upwardly against the force of a compression coil spring 72 between the gear housing (outside of the piston cylinder 73) and bearing 74 supported on a flange 75 to engage upper side teeth 76 of the feed coupling gear 58 with fixed teeth 77 on the inside of the gear housing. This locks the feed gear train and causes the spindle to be retracted as the drive gear 57 continues to rotate in the same direction, until the valve stem is returned to its initial position by nut 30a to release pressure from the piston cylinder, thereby allowing the spring 72 to return the feed coupling gear 58 to its initial position in engagement with the feed coupling gear.

Figure 3:
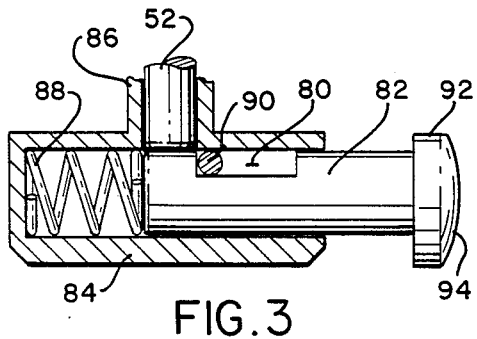
FIG. 3 illustrates in an enlarged view the idle latching means of the embodiment shown in FIG. 2.
Figure 4A:
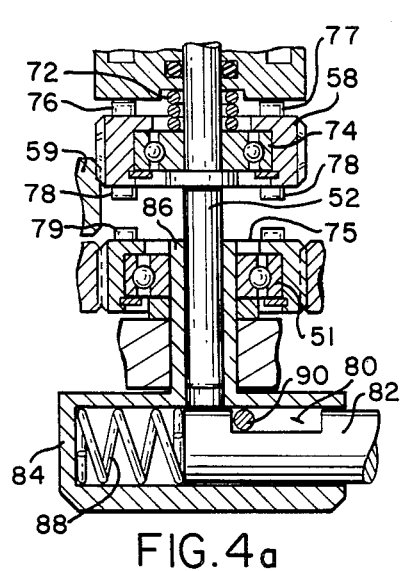
FIGS. 4a and 4b illustrate in vertical cross sections that part of the drill shown in FIG. 2 embodying the invention in both the retract mode and the idle mode, respectively.

A first embodiment of the present invention shown in FIG. 3 will now be described. The shaft 52 is raised by the piston 34 to lock the feed gear train, as shown in FIG. 4a. The end of the shaft opposite the piston is thus raised out of engagement with a notch 80 in a rod 82 guided in a tube 84 that is made as a unitary part of a sleeve 86 for the shaft 52 on which the drive coupling gear 51 is journaled with a ball bearing so that the shaft 52 may move axially without raising the drive coupling gear for that would bring it into engagement with the idler 59 for the feed gear train. A compression coil spring 88 then pushes the rod so that the notch 80 is no longer in alignment with the shaft, as shown in FIG. 4a. A transverse pin 90 prevents the notched rod from being pushed completely out of the guide tube 84. At the end of the spindle return a nut 30a, which is adjustable on the spindle 18 to limit the return stroke, moves the valve 31 to the upper position where it cuts off the air pressure to the piston 34 and opens the piston cylinder to exhaust.

Figure 4B:
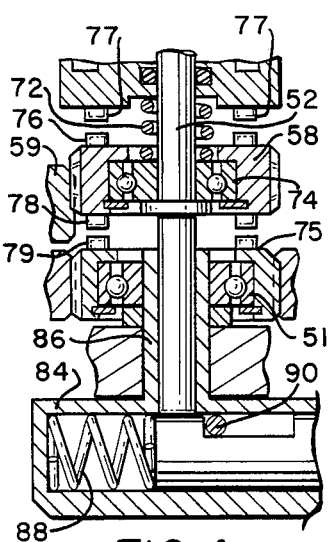

Once the spindle is retracted, and the air pressure in the piston cylinder is released, the feed coupling gear 58 is pushed out of locking engagement with teeth 77 on the gear housing by the spring 72, as shown in FIG. 4b, but the bottom of the shaft 52 is then seated against the rod 82, so that the feed coupling gear does not drop far enough for its lower side teeth 78 to re-engage upper side teeth 79 on the drive coupling gear 51. The tool is then in an idle mode.

To reset the spindle feed gear train for the next drilling or countersinking operation, the rod 82 is manually pushed back into the guide tube 84 against the force of the spring 88. The coil compression spring 72 then restores the feed coupling gear 58 to its normal position shown in FIG. 2, which is the feed mode.

Referring now to FIGS. 5-10, a second embodiment of the invention provides the idle latching means at the top of the shaft 52 to hold the feed coupling gear up upon retraction of the spindle, and places the piston 34 at the bottom of the shaft 52 to push the shaft up. However, the principle is the same, and to facilitate understanding this second embodiment, the same reference numerals are used for the parts common to both embodiments.

Figure 5:
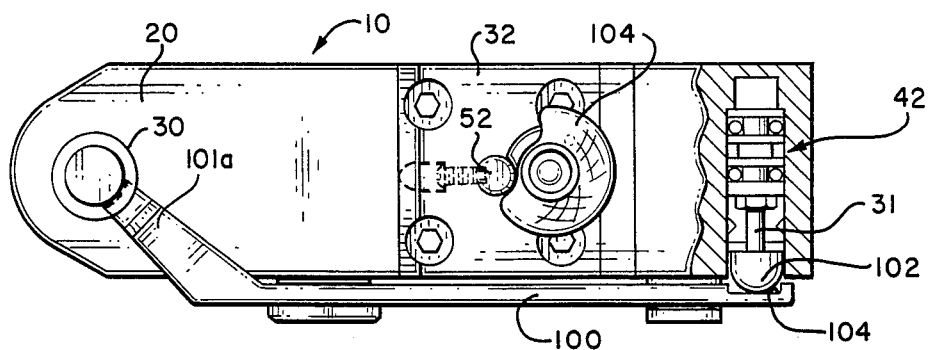
FIG. 5 is a top view of a positive feed drill having a second embodiment of the invention.
Figure 10A:
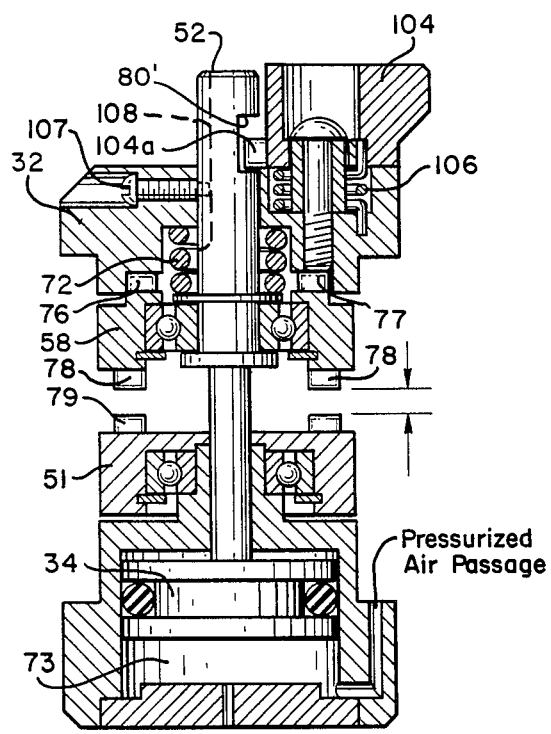
FIGS. 10a and 10b illustrate in vertical cross sections that part of the drill shown in FIG. 9 embodying the invention in both the retract mode and the idle mode.
Figure 10B:
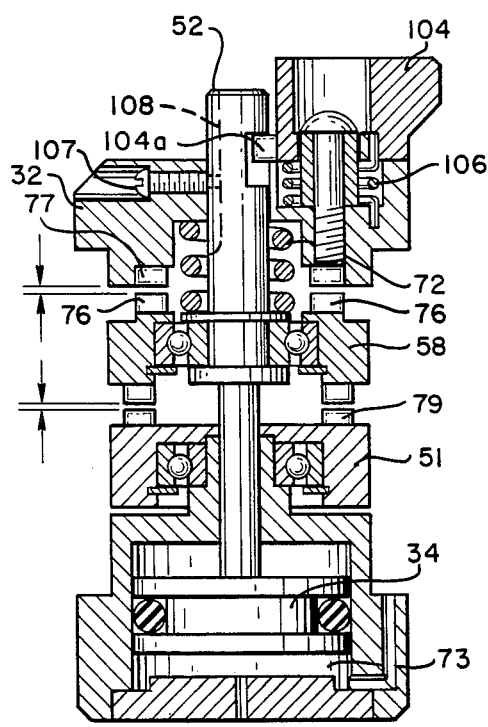

Basically, the positive feed drill 10 of the second embodiment is the same, but smaller. It has a drive gear train and a feed gear train arranged in the same way. However, because the housing 20 is much smaller, the valve 42 for retracting the spindle is at the rear of the tool, as shown in FIG. 5. When the spindle 18 is fed forward sufficiently, a nut 30 engages an arm 100a and pivots a Y-shaped lever 100. This pushes the lever 100 over a rounded end 102 of the valve stem. The part of the lever 100 which rides over that rounded end 102 has a slot 103 that is beveled so that as the lever 100 is pivoted, it gradually presses against the rounded end 102 and pushes the valve stem 31 in against air pressure from line 36 to open the valve. The valve is designed in a known manner so that once it is cracked open, the air pressure will quickly move the valve stem into its fully open position. This admits air under pressure into the piston cylinder 73, shown in FIG. 9, thus pushing the piston 34 upwardly, as shown in FIG. 10a, to lift the shaft 52, and thereby lift the feed coupling gear 58 out of engagement with the drive coupling gear 51, and into engagement with teeth 77 on the inside of the gear housing cap 32 to lock the feed gear train and thus retract the spindle as before.

When the spindle is retracting, a nut 30a at the lower end of the spindle similar to nut 30 engages an arm 100b and pivots the Y-shaped lever 100 clockwise to release the valve stem 31. This releases air pressure from the piston cylinder 73 and allows the coil compression spring 72 to push the feed coupling gear downwardly, thus disengaging upper side teeth 76 of the feed coupling gear 58 from locking teeth 77 on the inside of the gear housing cap 32. This also pushes the shaft 52 downwardly toward the drive position shown in FIG. 9, to an intermediate idling position where the feed coupling gear engages neither the teeth 77 on the inside the gear housing cap 32, nor teeth 79 on the top of the drive coupling gear 51, just as in the first embodiment. The only difference is in the arrangement of the idle latching means, which will now be described.

Figure 6:
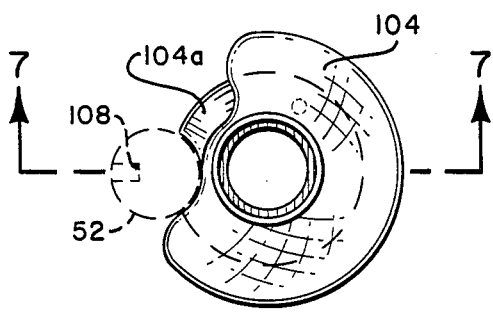
FIG. 6 is an enlarged top view of the idle latching means of the second embodiment shown in FIG. 5.
Figure 7:
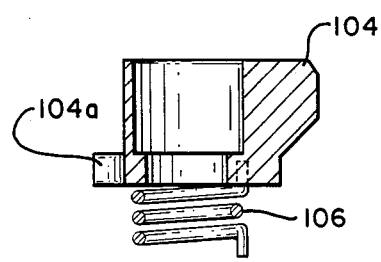
FIG. 7 is a cross section taken on a line 7—7 in FIG. 6.
Figure 8:
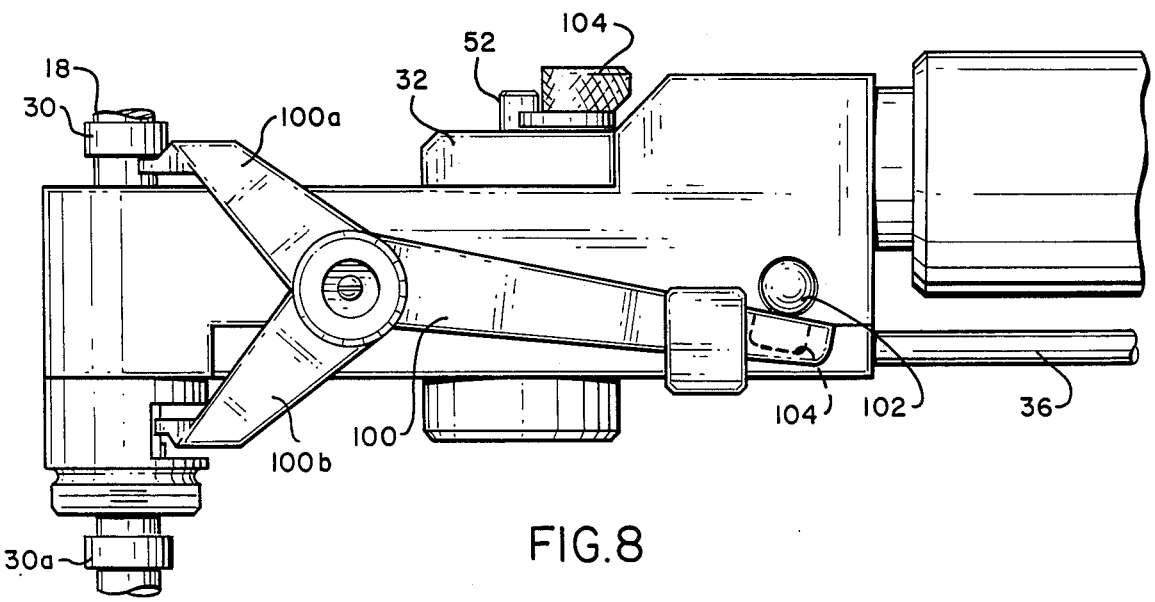
FIG. 8 is a side view of the positive feed drill shown in FIG. 5.
Figure 9:
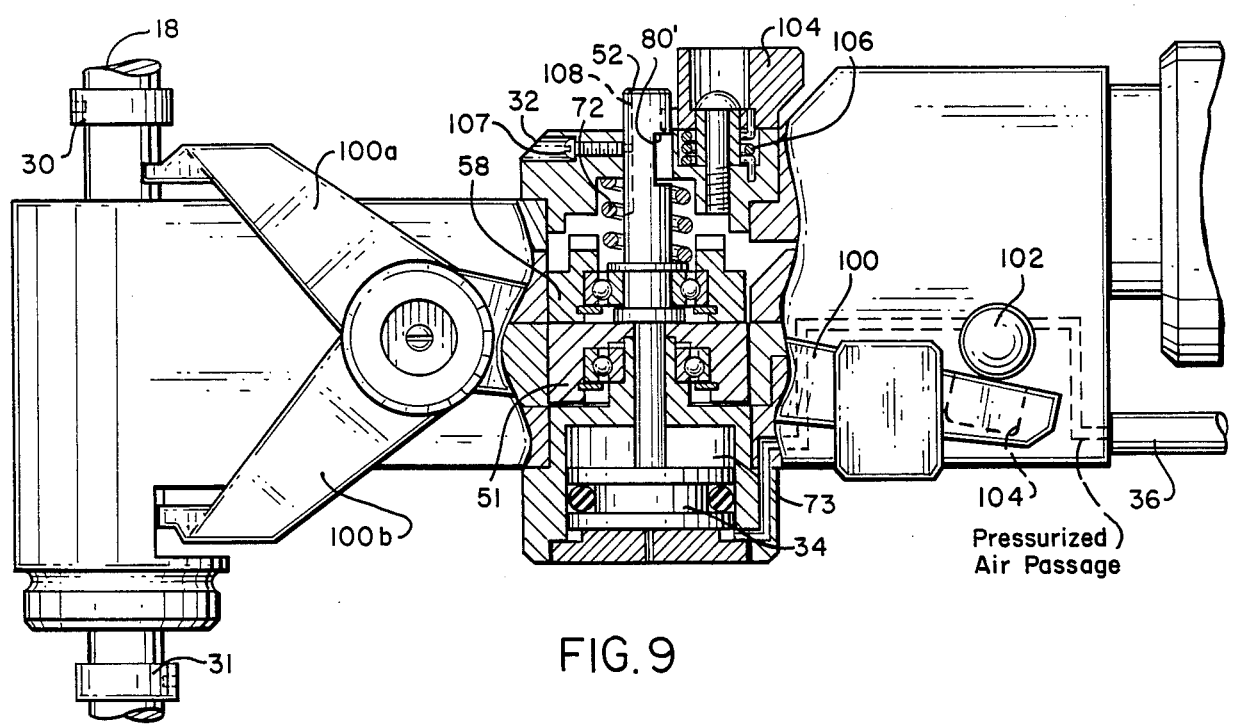
FIG. 9 is a vertical cross section of that portion of the drill shown in FIG. 8 embodying the second embodiment while in the feed mode.

With the piston 34 arranged to be at the bottom of the shaft 52, the idle latching means is more conveniently located at the opposite end (the top) of the shaft 52. In that case, a latching slot 80' is provided in the shaft, and a pivotal latching means 104 is arranged to pivot a latch 104a into that slot when the shaft has been raised to a position that places the slot in alignment with the latch 104a. FIG. 6 shows the pivotal latching means in a top view which is essentially a knurled knob having about 135° cut out to permit it to pivot about 40° counterclockwise from the position shown in FIG. 6 relative to the shaft 52 when the slot 80' is aligned with the latch 104a. The latter is preferably, but not necessarily, formed as a unitary part of the pivotal latching means 104.

A coil torsional spring 106 pivots the latch means when the slot in the shaft 52 is so aligned with the latch 104a. Note that it is this latch 104a against the shaft, as shown in FIG. 6, that prevents pivoting of the latching means 104, until the piston 34 raises the shaft. The slot in the shaft is long enough to permit locking the feed gear train, as shown in FIG. 10a, thus retracting the spindle, but the top of the slot 102 prevents the shaft 52 from being returned to the drive position shown in FIG. 9 until the locking means 104 is manually turned clockwise (when viewed from above as in FIG. 5) about 40° to withdraw the latch 104a from the slot 80. In that way, the positive feed drill is placed in the idle mode shown in FIG. 10b when the air pressure in piston cylinder is released once the lever 100 releases the valve stem 31. It will remain in the idle mode until the latching means 104 is manually turned 40° clockwise so that the latch 104a disengages the slot 80 to release the shaft 52. A set screw 107 in a groove 108 holds the shaft 52 against rotation, but allows the shaft to move up and down with the set screw sliding in the groove.

Although particular embodiments of the invention have been described and illustrated herein, it is recognized that modifications and variations may readily occur to thos skilled in the art. Consequently, it is intended that the claims be interpreted to cover such modifications and variations.

What is claimed is:

1. An idle system for a positive feed drill having a spindle drive gear train and a spindle feed gear train coupled to the drive gear train by side teeth on respective drive and feed coupling gears mounted on a common shaft, wherein the journal for said feed coupling gear is over a flange that is integral with said shaft, a spring between said feed coupling gear and a housing for said gear trains to bias said feed coupling gear against said flange, and thereby bias said shaft to a position where said feed coupling gear is coupled to said drive coupling gear, fixed teeth on said housing for engagement with teeth on said feed coupling gear on the side thereof opposite said drive coupling gear, actuatable means for moving said shaft against said spring to disengage said feed coupling gear from said drive coupling gear and lock said feed coupling gear against said fixed teeth to retract said spindle, and upon deactuation of said actuatable means to automatically allow said feed coupling gear to be disengaged from said fixed teeth, an idle system comprising spring biased means, responsive to said shaft being moved to a position for said feed coupling gear to engage said fixed teeth upon actuation of said actuatable means, for limiting the return of said shaft upon deactuation of said actuatable means once said actuatable means has been actuated to move said shaft and feed coupling gear into locking position of said feed coupling gear, said spring biased means having a slot a dimension of which limits the return of said shaft so that said feed coupling gear is disengaged from said fixed teeth and not re-engaged with said teeth of said drive coupling gear until said spring biased means is manually reset, wherein said spring biased means is comprised of a disk rotateable on an axis parallel to the axis of said shaft, and a spring which rotates said disk on said axis spaced from the axis of said shaft a distance less than the radius of said disk, a cutout sufficient to accommodate said shaft, a slot in said shaft of a depth sufficient for said disk to be rotated with the cutout thereof away from said shaft, thereby placing said disk in said slot to prevent a full return of said shaft, the length of said slot determining the extent of return until said disk is manually reset with its cutout aligned with said shaft, and a coiled torsion spring for automatically rotating said disk from said aligned position when said shaft is moved to place the slot thereof in alignment with said disk.

2. An idle system for a positive feed drill as defined in claim 1 wherein said disk includes an integral knob for manually turning said disk to reset said idle system.

3. An idle system for a positive feed drill as defined in claim 2 wherein said knob is of greater diameter than said disk, except over a limited sector which extends from the cutout of said disk over an angle of less than 90°, thereby limiting the extent said disk will rotate when said slot is aligned with said disk.

4. An idle system as defined in claim 1 wherein said actuatable means is comprised of a hydraulic piston, at one end of said shaft.

5. An idle system as defined in claim 4 wherein said piston is at the end of said shaft remote from said disk.

* * * * *